(12) United States Patent
Moreillon

(10) Patent No.: US 7,907,953 B2
(45) Date of Patent: Mar. 15, 2011

(54) ACCESS METHOD FOR CONDITIONAL ACCESS AUDIO/VIDEO CONTENT

(75) Inventor: Guy Moreillon, Bioley-Orjulaz (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 581 days.

(21) Appl. No.: 11/603,069

(22) Filed: Nov. 22, 2006

(65) Prior Publication Data

US 2007/0120957 A1    May 31, 2007

(30) Foreign Application Priority Data

Nov. 25, 2005   (EP) .................................. 05111336

(51) Int. Cl.
*H04W 72/00* (2009.01)
(52) U.S. Cl. ...... 455/453; 455/3.01; 455/3.04; 715/741; 725/25
(58) Field of Classification Search .................. 455/3.04; 725/86, 25
See application file for complete search history.

(56) References Cited

U.S. PATENT DOCUMENTS

| | | | |
|---|---|---|---|
| 5,003,384 A | | 3/1991 | Durden et al. |
| 6,041,231 A * | | 3/2000 | Suzuki ........................ 455/435.1 |
| 6,637,027 B1 * | | 10/2003 | Breslauer et al. ................ 725/25 |
| 7,174,126 B2 * | | 2/2007 | McElhatten et al. .......... 455/3.04 |
| 7,392,037 B2 * | | 6/2008 | Qi et al. .......................... 455/410 |
| 7,444,413 B2 * | | 10/2008 | Saxena ........................... 709/229 |
| 2003/0159150 A1 * | | 8/2003 | Chernock et al. ................ 725/58 |
| 2003/0219127 A1 * | | 11/2003 | Russ et al. ..................... 380/239 |
| 2004/0090930 A1 * | | 5/2004 | Lee et al. ........................ 370/328 |
| 2004/0203338 A1 * | | 10/2004 | Zilliacus ........................ 455/3.04 |
| 2005/0278640 A1 * | | 12/2005 | Jones et al. ..................... 715/741 |
| 2007/0111717 A1 * | | 5/2007 | Mueller et al. ................. 455/418 |

FOREIGN PATENT DOCUMENTS

WO      01/80460 A     10/2001

OTHER PUBLICATIONS

Clayson, P.L., et al., "Systems Issues in the Implementation of DVB Simulcrypt Conditional Access," Broadcasting Convention, 1997, pp. 470-475 (Sep. 12, 1997).
"Functional Model of a Conditional Access System," EBU Review—Technical, European Broadcasting Union, No. 266, pp. 64-77 (Dec. 21, 1995).

\* cited by examiner

*Primary Examiner* — Rafael Pérez-Gutiérrez
*Assistant Examiner* — Issam Chakour
(74) *Attorney, Agent, or Firm* — DLA Piper LLP US

(57) ABSTRACT

A method that allows the optimization of the consumption of conditional access content in order to guarantee less vulnerable right messages involves three steps: the selection by the user of a content and the indication of this interest to said management center; the sending of a notification message containing or indicating the access authorisation message shortly before the broadcast of said content and storage of this authorisation message; and the sending of the content itself and the use of the data of the authorisation message in order to access the data of the content. There may be a fourth stage, namely the validation of the authorisation message by the user. This validation is executed in general at the time of the reception of the content or alternatively the user confirms their intention to purchase.

15 Claims, 1 Drawing Sheet

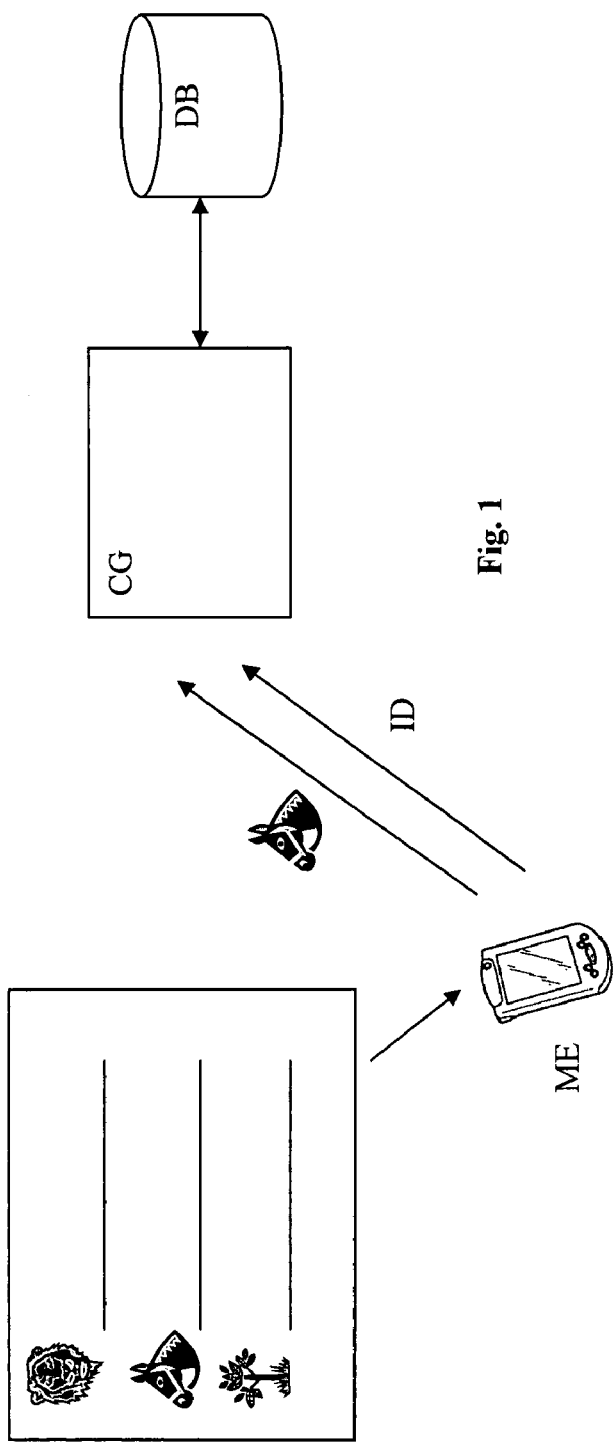
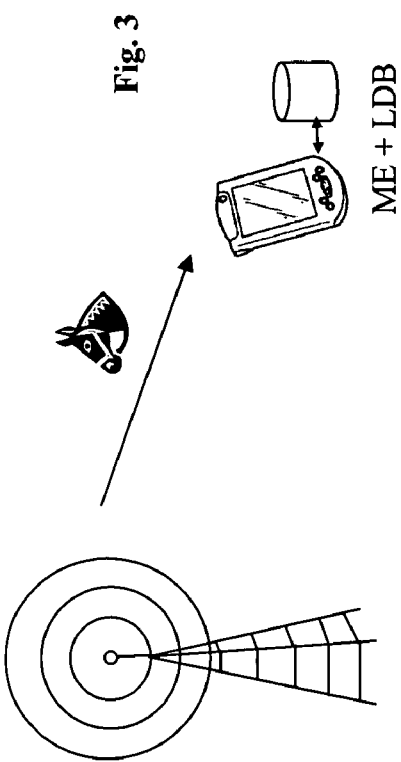
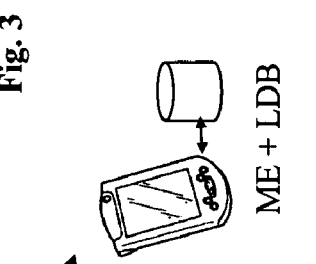
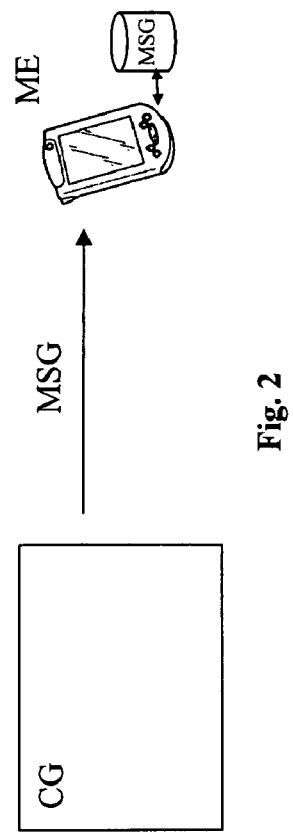
Fig. 1
Fig. 2
Fig. 3

ACCESS METHOD FOR CONDITIONAL ACCESS AUDIO/VIDEO CONTENT

BACKGROUND

1. Field of the Invention

The present invention relates to the field of the reception of video contents on mobile terminals, in particular the procedures allowing the reception of contents on request.

This application is based on and claims priority to EP 05111336.3, filed Nov. 25, 2005, the entire contents of which being hereby incorporated by reference.

2. Discussion of Background

The broadcasting servers schematically stream two types of products, those with free access and those with conditional access. For the second type, the content is encrypted by at least one encryption key. At the time of the broadcast of said encrypted content, a descriptor indicates the rights that are necessary to access this content and the enciphering key, this descriptor being called a control message (ECM). This message is processed by a security module located in the mobile terminal that comprises means to process this control message and verify if the mobile terminal disposes of the corresponding right.

Therefore, before the reception of a multimedia content, the right relative to this content must be loaded into the terminal, in particular in the security module. According to another embodiment, the right is replaced with a key that is used to decrypt the control message comprising the current decryption key of the content.

According to one conventional method, the user access a presentation service for contents related to events and selects one or more contents in which he is interested. In this method called point-to-point, a message is sent to the user, such message including the key or the right to access the event.

This message is stored in the security means of the mobile terminal and when the event is proposed to said mobile terminal, the message is decrypted, the credit (if any) is processed and the key (CW) for the event is returned to the mobile terminal.

It is to be noted that on numerous occasions the user cannot receive the content for technical reasons (no reception) or that the user simply forgets to make the necessary arrangements.

Another aspect is the security of the transmitted message. In fact, this message can be transmitted several days in advance, which offers third parties many possibilities of breaking the encryption of this message to extract the right or the keys and thus to have access to the content without paying the related fee.

SUMMARY

The aim of the present invention is to propose a method that allows the optimization of the consumption of these conditional access contents by guaranteeing less vulnerable right messages.

This aim is achieved by an access method for conditional access to audio/video content managed by a management center and broadcasted by a broadcast center, the access to this content being conditioned by the reception of a right message comprising access authorization in the form of a right and/or of a key, this method comprising the following steps:

global replace for authorization access by a user of a mobile terminal to a set of data describing a plurality of audio/video contents available from a broadcast center, selection by the user of said mobile terminal of at least one audio/video content intended to be transmitted at a later time, transmission by the mobile terminal of the result of the selection as well as of an identifier of the mobile terminal to the management center, determination by the management center of a reminder time calculated according to the later time of the broadcast of said audio/video content minus a predefined reminder time interval, when the reminder time is reached, sending by the management center of a notification message containing an indication allowing access to the right message containing the access authorisation to said content intended for said mobile terminal, validation of the right message by the mobile terminal and extraction of the access authorisation allowing access to said content.

Therefore, according to the invention, access to a content takes place in three stages:

the selection by the user of a content and the indication of this interest to said management center.

the sending of a notification message containing or indicating the access authorisation message shortly before the broadcast of said content and storage of this authorisation message.

the sending of the content itself and the use of the data of the authorisation message in order to access the data of the content.

There may be a fourth stage, namely the validation of the authorisation message by the user. This validation is executed in general at the time of the reception of the content or alternatively the user confirms their intention to purchase.

This operation can be executed automatically, without the intervention of the user assuming that the user has selected the receiver of his mobile terminal on the channel broadcasting the content in question.

BRIEF DESCRIPTION OF THE DRAWINGS

The invention will be better understood with reference to the following detailed description that refers to the annexed drawings that are given as a non-limiting example, namely:

FIG. 1 describes the first stage, namely the placing of the order,

FIG. 2 describes the second stage, namely the reception of a notification message, FIG. 3 describes the third stage, namely the reception of the multimedia content.

DETAILED DESCRIPTION

As illustrated in FIG. 1, the user of a mobile terminal ME disposes of two means to access the list of multimedia contents available for broadcast. According to a first method, referred to as web mode, the mobile terminal connects to an Internet type service and selects the page(s) of interest. A point-to-point bidirectional virtual channel is thus created between the management center CG and the mobile terminal ME. Once this selection has been made, the validation of one or several selected contents is stored in the database DB of the management center with an indication of the identity ID of the mobile terminal transmitted to the management center during an identification step.

The second method that can be used to access the list of contents offered by the management center consists in receiving the data forming the lists on a broadcast channel dedicated to this purpose. It concerns a one-way broadcast of the type that can be received as an electronic programme guide. Once the user has made the selection, a reservation message containing the identification of content(s) of interest as well as the indication of the identity ID of the module terminal ME is transmitted to the management center. The message can be sent by a simple SMS message, by a GPRS packet or a brief connection of the web type or even any other communication means.

It is to be noted that at this stage, the choice of the user can be the manifestation of his interest and not a definite order. The debit of the user's account will subsequently be managed when the latter generates the confirmation order.

The selection by the user can remain vague on the content chosen and only indicate a content category. As a consequence the management center will generate the sending of a notification message each time a content responds to the user's selection. For a series such as "Friends" for example, this type of message will be transmitted before the broadcast of each episode.

The second stage is illustrated in FIG. 2, namely the reception of a notification message MSG. This message is sent by the management center CG to the mobile terminal ME concerned and can contain a right message, that is to say a right that allows the access to said content, or a key allowing the decryption of said content (or the control messages accompanying the content). At this stage, the reception of this message does not lead to the debiting of the user's account for the price agreed for the content since the right or the key is not loaded into the active part of the security module of said terminal. This debiting will be executed when the user has validated the proposal.

According to another embodiment of the invention, the notification message contains a piece of information allowing the mobile terminal to discover where this right message is to be extracted in the data stream. The data of the right message as described above is not located in the notification message but rather in the data stream, in a message SI for example. The emission of the notification message opens a time window during which the management center sends the data of the right message with the multimedia data flow. The address allows the configuration of a filter on the data and the access to data of the right message.

According to a first embodiment, this right message is encrypted by a transmission key that is common to all the mobile terminals. If higher security is desired, this message can be encrypted by a key unique to said mobile terminal ME (i.e., a key that is not shaved by other mobile terminals ME). In the case of the sending of a content key in said message, on one hand this content key can pertain to the future content to be deciphered and on the other hand can be encrypted by the unique key of the decryption module of the mobile terminal. According to this approach, each mobile terminal possesses a unique Key that acts on each content key sent to the decryption module. The content key must therefore be encrypted by the unique key pertaining to the mobile terminal before being placed in the notification message. Therefore, the message itself can be encrypted by a key common to all the mobile terminals, or even according to an embodiment, sent in plain language without encryption.

The elements of this right message are stored in the mobile terminal ME database. The sending of the notification message containing this right message is carried out shortly before the start of the broadcast of the multimedia content. This allows the reduction of the time in which an ill-intentioned third party may try to "crack" (i.e., break the encryption of) the message to extract the content key or the rights. The transmission means are different and use existing technological means such as SMS, MMS, GPRS, and Wifi. This notification message MSG invites the user to validate his purchase for the specified content. The user has the means to activate the reception of the content mentioned without having to call the management center. Due to the short time before the start of the content, the user can know more about its availability at the time of the broadcast of the content.

If the user also had to call the management center to obtain the right or the key related to the content broadcasted soon, this center would quickly be overloaded shortly before the broadcast of important television events.

When the user accepts the offer contained in the notification message, a accounting operation is executed by the mobile terminal, in particular by the security module of said mobile terminal ME. The right or the content key is loaded into the security database LDB of the mobile terminal, which forms part of the security module, and the mobile terminal is ready for the third stage. This accounting operation can debit a credit in the security module of the mobile terminal, or can simply be stored in order to be transmitted to the management center that will invoice the user later. The accounting policy can be included in the notification message.

FIG. 3 shows the reception of the desired content transmitted by the broadcast center. The mobile terminal disposes of the right or of the content key to access this content. According to a known technique, the content is accompanied by control messages ECM containing the control words CW that are the temporary encryption keys of the content. These messages are sent to the security module of the mobile terminal and if the right related to this content is present, the security module sends back the control word of the content to the decryption module, thus allowing the use of said content. The aforementioned right is included in the local database LDB of the mobile terminal.

In the foregoing example, we have described a management center distinct from the broadcast center for reasons of clarity. Nevertheless, these two centers can be combined in one single entity.

According to another embodiment of the invention, the right message can comprise several access rights to the content, in particular if the contents are linked by a common concept. If a user has shown interest in a football match, the right message will include, for example, a right for the series of matches of the team selected by the user. The amount to be debited on the user's credit can be different to the amount that this same user would have paid if he had bought each match individually.

This message comprises an information part intended for the user. The user can be informed of the modalities of the offer being proposed.

When the right message arrives at the mobile terminal, either directly (all the data is in the notification message) or indirectly (the data is in the data stream), it causes the creation of a new reminder according to a predefined time. According to one example, the notification message arrives one hour before the start of the broadcast of the desired content. This message initiates a reminder function 10 minutes before the start of the broadcast as a reminder to the user. This reminder action can be independent as the user may or may not have accepted the purchase of the content. Whether the user has or has not accepted the purchase on reception of the message, acceptance can be given at a time after the reminder.

The reminder parameters can either be included in the data of the notification message, or a function pre-programmed by the user in his mobile terminal. There may be one or several reminders, or even the subsequent display of a pictogram indicating the time remaining.

According to one alternative of the invention, the selection by the user of content(s) of interest can be executed in another way instead of using the mobile terminal. The user can log in with his computer to the management center site and after the selection of the contents, he indicates the telephone number of his mobile terminal (or any other indication that allows the user's mobile terminal to be addressed without mistakes, such as a MAC address). Therefore, the user disposes of a greater flexibility to select the content of interest and can make a selection for the whole week. The notification message(s) will be sent on a mobile terminal and the user will be certain not missing anything.

What is claimed is:

1. An access method for conditional access of audio/video content managed by a management center and transmitted by a broadcast center, the access to this content being conditioned by the reception of a right message comprising access authorization in the form of a right and/or of a content key, the method comprising the steps of:

providing access to a user of a mobile terminal to a set of data describing a plurality of audio/video contents available from a broadcast center;

accepting a selection by the user of said mobile terminal of at least one audio/video content intended to be transmitted at a transmission time;

transmitting, by the mobile terminal, a result of the selection and an identifier of the mobile terminal to the management center;

determining, by the management center, a reminder time calculated according to the transmission time of the broadcast of said audio/video content minus a predefined reminder time interval;

when the reminder time is reached, sending by the management center of a notification message containing an indication allowing access to a right message containing an access authorization to said content intended for said mobile terminal;

displaying by the mobile terminal a prompt to the user in response to receipt of the notification message;

receiving by the mobile terminal a user action in response to the prompt confirming the acquisition of the audio/video content by the user;

validating the right message by the mobile terminal;

extracting by the mobile terminal the access authorization allowing access to said content; and receiving and displaying the content by the mobile terminal;

wherein the notification message is received by the mobile terminal prior to display of the prompt to the user.

2. An access method for conditional access of content according to claim 1, wherein the notification message contains the right message.

3. An access method for conditional access of content according to claim 1, wherein the notification message contains filtering data allowing the right message to be found in the data transmitted by the broadcast center.

4. An access method for conditional access of content according to claim 1, wherein the management center transmits the set of data describing a plurality of audio/video contents toward a plurality of portable terminals, the selection of an audio/video content by the user of a mobile terminal generating the sending of a reservation message comprising the audio/video content(s) selected and the identifier of said mobile terminal.

5. An access method for conditional access of content according to claim 1, wherein the user accesses the management center for selection from among the audio/video content offered, the selection of an audio/video content by the user of a mobile terminal generating the sending of a reservation message comprising the audio/video content selected and the identifier of said mobile terminal.

6. An access method for conditional access of content according to claim 1, wherein the right message containing the right and/or the relative content key to said audio/video content is encrypted by a key common to a plurality of mobile terminals.

7. An access method for conditional access of content according to claim 1, wherein the right message containing the right and/or the relative content key to said audio/video content is encrypted by a key pertaining to said mobile terminal.

8. An access method for conditional access of content according to claim 1, wherein the reception of the notification message leads to the display of a new notification on the mobile terminal according to a predefined time.

9. An access method for conditional access of content according to claim 1, wherein the reception of the notification message leads to the user being invited to validate the reception of said audio/video content, this validation updating a database of the authorization rights and/or content keys and an accounting operation.

10. An access method for a conditional access of content according to claim 9, wherein the accounting operation includes a debit operation of a credit locally stored in the mobile terminal.

11. An access method for a conditional access content according to claim 9, wherein the accounting operation generates accounting data that will be transmitted later to the management center.

12. A system for providing conditional access to an audio/video content, the system comprising:

a broadcast center for transmitting an audio/video content;

a mobile terminal configured to receive the audio/video content from the broadcast center; and a management center in wireless communication with the mobile terminal;

wherein the mobile terminal is configured to perform the steps of providing access to a set of data describing a plurality of audio/video contents available from the broadcast center;

accepting a selection by the user of an audio/video content intended to be transmitted at a transmission time, the transmission time being later than a current time;

transmitting a result of the selection and an identifier of the mobile terminal to the management center;

receiving a notification message containing an indication allowing access to a right message containing an access authorization to said content intended for said mobile terminal;

displaying a prompt to the user in response to receipt of the notification message;

receiving a user action in response to the prompt confirming the acquisition of the audio/video content by the user;

validating the right message;

extracting the access authorization allowing access to the content; and receiving and displaying the content;

wherein the management center is configured to perform the steps of:

determining a reminder time calculated based on a transmission time of the broadcast of said audio/video content minus a predefined reminder time interval; and when the reminder time is reached, sending the notification message to the mobile Terminal; and wherein the notification message is received by the mobile terminal prior to display of the prompt to the user.

13. The system of claim 12, wherein the access authorization is in the form of a right.

14. The system of claim 12, wherein the access authorization is in the form of a content key.

15. The system of claim 12, wherein the notification message contains filtering data allowing the right message to be found in the data transmitted by the broadcast center.

* * * * *